United States Patent [19]

Biek

[11] 4,063,601

[45] Dec. 20, 1977

[54] ROTARY IMPACT TOOL

[75] Inventor: Paul Albert Biek, Houston, Tex.

[73] Assignee: Dresser Industries, Inc., Dallas, Tex.

[21] Appl. No.: 716,496

[22] Filed: Aug. 23, 1976

[51] Int. Cl.$^2$ .............................................. B01D 23/28

[52] U.S. Cl. .................................................... 173/93.6

[58] Field of Search ............................ 81/52.3, 52.35; 173/93.6, 109, 123

[56] References Cited

U.S. PATENT DOCUMENTS

| | | | |
|---|---|---|---|
| 2,637,426 | 5/1953 | Van Sittert | 173/93.6 |
| 2,825,436 | 3/1958 | Amtsberg | 173/93.6 |
| 2,881,884 | 4/1959 | Amtsberg | 173/93.6 |
| 3,053,360 | 9/1962 | Madsen | 173/93.6 |
| 3,106,274 | 10/1963 | Madsen | 173/93.6 |
| 3,156,334 | 11/1964 | Hoza | 173/93.6 |
| 3,174,597 | 3/1965 | Schaedler et al. | 173/93.6 |
| 3,237,703 | 3/1966 | Ramstrom | 173/93.6 |
| 3,323,395 | 6/1967 | Burnett et al. | 81/52.3 |
| 3,414,066 | 12/1968 | Wallace | 173/93.6 |
| 3,581,831 | 6/1971 | Biek | 173/93.6 |

*Primary Examiner*—Lawrence J. Staab
*Attorney, Agent, or Firm*—Roy L. Van Winkle; John N. Hazelwood

[57] ABSTRACT

A rotary impact tool having a fluid operated motor with a hammer slidably mounted with respect to the rotor and rotatable therwith, an anvil normally spaced axially from the hammer, force transmitting means for transmitting rotation of the rotor to the anvil and for moving the hammer toward and away from the anvil for rotary impact therewith without imposing axial forces on the rotor, except for inconsequential frictional forces between splines.

3 Claims, 2 Drawing Figures

ROTARY IMPACT TOOL

BACKGROUND OF THE INVENTION

This invention relates to improved rotary impact tools. More particularly, but not by way of limitation, this invention relates to an improved rotary impact tool that may be described as being telescopically arranged.

Prior constructed, telescopically-arranged, rotary impact tools are illustrated by U.S. Pat. No. 3,581,831 issued June 1, 1971 to Paul A. Biek and U.S. Pat. No. 3,156,334 issued to M. D. Hoza on Nov. 10, 1964. Impact tools constructed in accordance with the disclosures of those patents have operated reasonably satisfactorily. However, the structures illustrated impose an axially directed force on the rotor when the hammers contained therein are biased into impacting engagement with the anvils. The axially directed forces thus imposed result in wear on the rotor, causing difficulty in maintaining the end seals on the rotor, less efficient operation of the rotor, and complicate the maintenance and rebuilding of the impact tool when necessary.

An object of this invention is to provide an improved rotary impact tool wherein little or no axially directed forces are imposed on the rotor.

A further object of the invention is to provide an improved rotary impact tool wherein the fluid motor will operate more efficiently.

Still another object of the invention is to provide an improved rotary impact tool that requires less maintenance and is easier to rebuild when maintenance is necessary.

SUMMARY OF THE INVENTION

The improved rotary impact tool of this invention comprises: a housing; a rotor having an axis of rotation and journaled in the housing; and means for rotating the rotor. Also included is an anvil that is journaled in the housing, a hammer that is located in the housing for impacting the anvil. The hammer and rotor include means for connecting the hammer and rotor for mutual rotation about the axis of rotation and for permitting relative movement therebetween along the axis of rotation. Force transmitting means is located in the housing for transmitting rotation of the rotor to the anvil and for moving the hammer along the axis of rotation toward and away from the anvil without imposing an axial force on the rotor.

BRIEF DESCRIPTION OF THE DRAWING

The foregoing and additional objects and advantages of the invention will become more apparent when read in conjunction with the accompanying drawings wherein.

DETAILED DESCRIPTION OF THE PREFERRED EMBODIMENT

Figure 1:
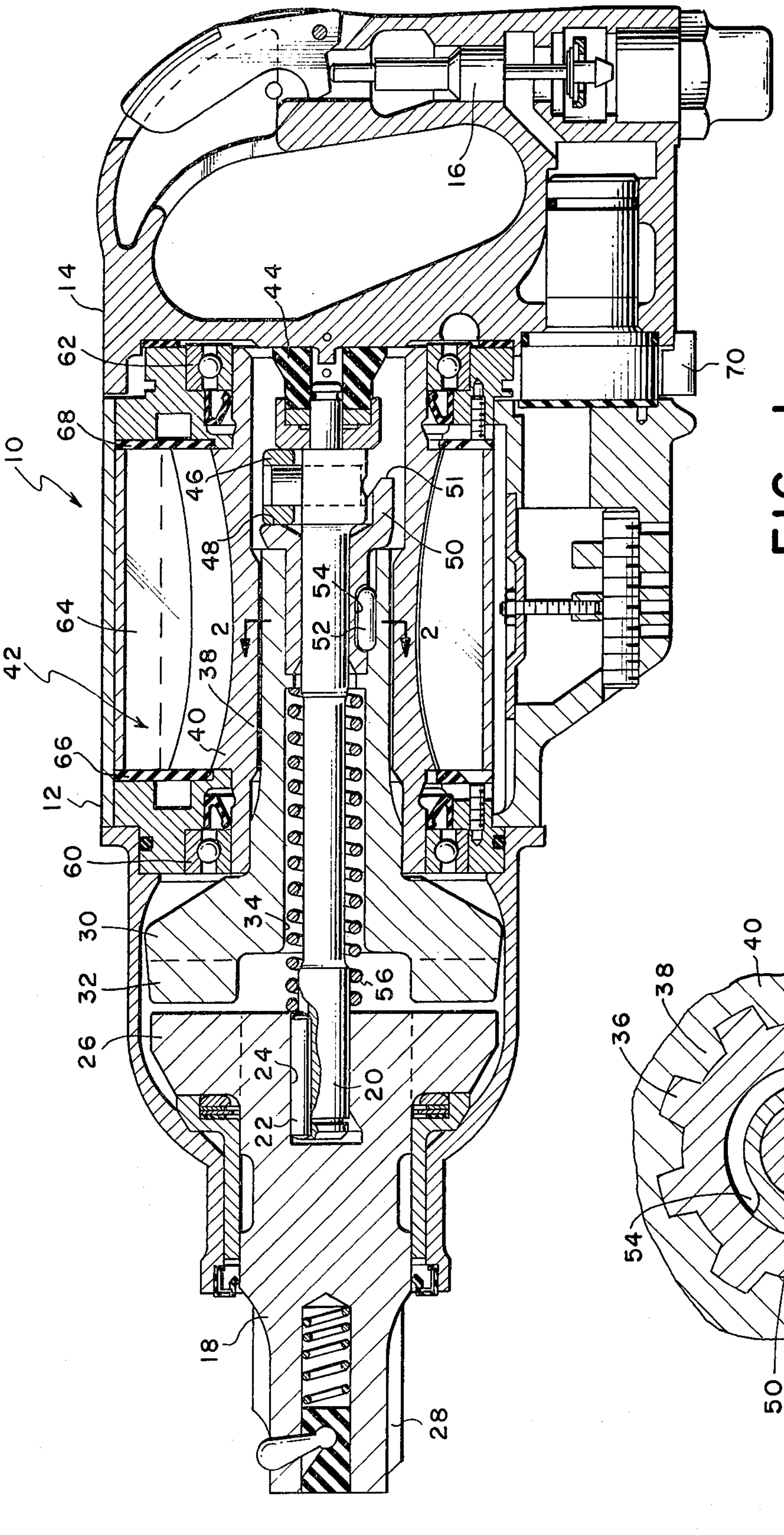
FIG. 1 is a cross-sectional view of a rotary impact tool constructed in accordance with the invention.

Referring to the drawing and to FIG. 1 in particular, shown therein and generally designated by the reference character 10, is a rotary impact tool that is constructed in accordance with the invention. The impact tool 10 includes a hollow housing 12, which may be constructed from several interconnected parts, and a handle portion 14 that is connected to the hollow housing 12. The handle portion 14 includes a trigger-actuated valve mechanism 16 for controlling the supply of fluid under pressure to the tool 10.

Journaled in the housing 12 is an anvil 18 that is connected to a shaft 20 for common rotation by a key or pin 22. The pin 22 and one end of the shaft 20 are disposed in a cavity 24 formed in the anvil 18. The anvil 18 also includes a pair of impact lugs 26 on one end thereof that are within the housing 12 and a tool receiving portion 28 that projects outwardly of the housing 12.

Within the housing 12, the anvil 18 confronts a hammer 30 having impact lugs 32 thereon arranged for impacting engagement with the impact lugs 26 on the anvil 18 as will be described. The hammer 30 has a bore 34 extending therethrough encircling a portion of the shaft 20. A reduced exterior portion of the hammer 30 is provided with a plurality of circumferentially spaced splines 36 that drivingly mate with splines 38 formed in the interior of a rotor 40, which forms a portion of a fluid motor 42.

Referring again to the shaft 20, it can be seen that the end thereof remote from the anvil 18 is journaled in and supported by a shock absorber 44. Located in the shaft 20 is a cam follower 46 that is disposed at a right angle to the axis of rotation of the shaft 20. The cam follower 46 is disposed in engagement with a cam surface 48 formed on a cam member 50. The cam surface 48 has a node 51 thereon that, when the shaft 20 rotates relative to the cam member 50, causes an axial displacement of the hammer 30 toward the anvil 18.

Figure 2:
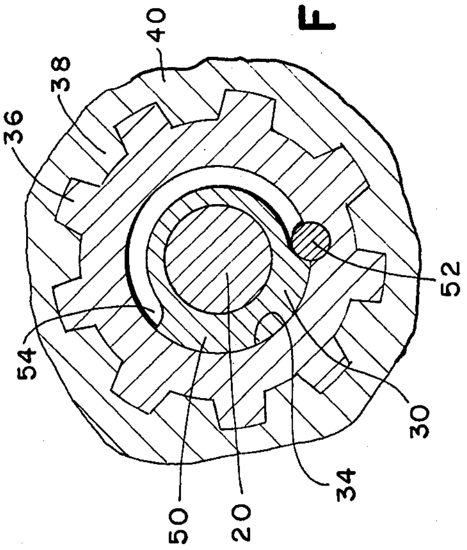
FIG. 2 is a partial and enlarged cross-sectional view taken substantially along the line 2—2 of FIG. 1.

The cam member 50 includes a portion disposed within the bore 34 of the hammer 30. Limited relative rotation between the cam member 50 and the hammer 30 can occur due to the presence of a lost motion connection therebetween. Referring to FIG. 2, it can be seen that the lost motion connection is provided by: a pin 52 that is located in a recess formed in the hammer 30 adjacent to bore 34 and an arcuate recess 54 that is formed in the exterior of the cam member 50 extending partially about the periphery thereof. Thus, rotation of the cam member 50 relative to the hammer 30 occurs until one end of the groove 54 engages the pin 52. The provision of this loss motion connection provides for the proper timing of the impacting engagement between the impact lugs 26 and 32 upon reversal of the direction of the fluid motor and also permits the hammer 30 to rebound upon impacting the anvil 18.

Also disposed within the bore 34 in encircling relationship to the shaft 20 is a compression spring 56 that has one end in engagement with the anvil 18 and the other end in engagement with the hammer 30. The spring 56 normally biases the hammer 30 relatively away from the anvil 18 and into the position illustrated in FIG. 1. The spring 56 further serves to retain the cam surface 48 on the cam member 50 in engagement with the cam follower 46.

As previously mentioned, the tool 10 also includes fluid motor 42 that is disposed within the housing 12. The rotor 40 of the motor 42 is journaled in the housing 12 by bearings 60 and 62 located adjacent either end thereof. Sliding vanes 64 are circumferentially spaced about the rotor 40 and are radially movable in slots formed in the rotor 40 as well known in the art. Seals 66 and 68 located on each end of the vanes 64 prevent the escape of the pressure fluid until appropriate exhaust ports (not shown) are exposed therein.

As previously mentioned, the rotor 40 is drivingly connected to the hammer 30 by mating splines 36 and 38. It will be apparent that the splines extend axially with respect to the axis of rotation of the shaft 20 and, since such splines form the only connection between the hammer 30 and the motor 42, no axial load can be imposed on the rotor 40 of the motor 42 by the hammer 30, except for the small force resulting from friction between the splines 36 and 38.

It has also been mentioned previously that the lost motion connection is needed to time the hammer 30 with respect to the anvil 18 when the direction of rotation tool 10 is reversed. While not illustrated in detail, it will be understood that appropriate passageways for the fluid supply are provided through the tool 10 and in conjunction with a reversing valve 70, direct the pressure fluid in such a manner as to cause the reverse rotation of the motor 42.

OPERATION OF THE PREFERRED EMBODIMENT

With the impact tool 10 connected to a source of fluid under pressure (not shown), and a socket wrench or other tool located on the exposed end 28 of the anvil 18, the trigger-actuated valve mechanism 16 is moved to a position permitting the pressure fluid to flow through the tool 10 into the motor 42. The flow of such pressurized fluid causes rotation of the rotor 40 and, through the mating splines 36 and 38, causes rotation of the hammer 30.

When the pin 52, which is carried by the hammer 30, engages one end of the slot 54 in the cam member 50, the cam member 50 rotates and, due to its engagement with the cam follower 46, causes rotation of the shaft 20. The shaft 20 is restrained from moving axially to any significant extent by the anvil 18 on one end and by the shock absorber 44 on the other.

As has been described, the anvil 18 is connected to the shaft 20 and is rotatable therewith. Such rotation continues until the wrench on the anvil 18 encounters sufficient force to cause additional relative rotation between the cam follower 46 and the cam member 50. When this occurs, the cam follower 46, which is carried by the shaft 20 and, thus fixed against axial movement, rides over the node 51 on the cam surface 48 forcing the cam member 50 axially toward the left as illustrated in FIG. 1.

Movement of the cam member 50 carries the hammer 30 toward the left compressing the spring 56 and bringing the lugs 32 on hammer 30 into impacting engagement with the lugs 26 on the anvil 18. As soon as the cam follower 46 clears the node 51, the spring 56 drives the hammer 30 relatively to the right as shown in FIG. 1 moving the lugs 32 on hammer 30 out of engagement with the lugs 26 on the anvil 18.

It will be understood that movement of the hammer 30 relative to the rotor 40 is permitted by the splines 36 and 38 which are aligned in the same direction as the movement, so that no axial load is imposed on the rotor 40. As a result, the rotor 40 and the vanes 64, which are carried by the rotor 40, remain in a centrally located position in the fluid motor 42 and no axial load is imposed on the seals 66 or 68. Accordingly, the motor 42 operates more efficiently. Also, it will be noted that when it is necessary to replace the seals 66 and 68 of the motor 42, it is not necessary to compensate for any wear that would otherwise be a result of axial loading imposed on the rotor 40 and vanes 64.

From the foregoing detailed description, it can be seen that the tool 10 is capable of performing all the tasks of previously known impact tools without the problems caused by the axial loads that are imposed on the fluid motors of such previously known rotary impact tools.

The embodiment described in detail herein is presented as a way of example only and many changes or modifications can be made thereto without departing from the spirit of the invention.

The embodiments of the invention in which an exclusive property or privilege is claimed are defined as follows:

1. An improved rotary impact tool comprising:
- a housing;
- a rotor journaled in said housing, said rotor having an axial bore and having axially oriented splines in said bore;
- means for supplying fluid into said housing to cause said rotor to rotate;
- a hammer in said housing having an axial passageway extending therethrough, an enlarged end, and a reduced end portion located within said axial bore, said reduced end portion having splines on the exterior thereof mating with the splines in said axial bore for transmitting the rotary motion of said rotor to said hammer and for permitting relative axial movement therebetween;
- an anvil journaled in said housing including an enlarged end confronting the enlarged end of said hammer and arranged to operably engage said hammer, a reduced end portion projecting outwardly of said housing, and a cavity formed in said enlarged end portion;
- a shaft extending through said hammer having a first end located in said cavity and connected to said anvil for rotation therewith, and having a second end journaled in said housing;
- a cam follower located in said bore, mounted on and rotatable with said shaft;
- a cam member on said shaft within said bore and having a cam surface engaging said cam follower, said cam member having a reduced diameter portion located in said passageway and rotatable and axially movable with said hammer; and
- resilient means urging said hammer relatively away from said anvil and said cam member toward said cam follower, whereby engagement of the cam surface on said cam member with said follower causes rotation of said shaft and anvil until a predetermined resistance to rotation of said anvil occurs, at which time said cam follower moves said cam member and hammer axially into impacting engagement with said anvil without exerting axial forces on said rotor.

2. The improved rotary impact tool of claim 1 and also including lost motion connection means between the reduced diameter portion of said cam member and hammer for timing the axial movement of said hammer toward said anvil and for permitting rebound of said hammer after said hammer impacts on said anvil.

3. The improved rotary impact tool of claim 2 wherein said lost motion means includes:
- an arcuate groove formed in and extending partially about the reduced diameter portion of said cam member located in said passageway; and,
- a connecting pin carried by said hammer and located in said groove, whereby limited relative rotational movement between said cam member and hammer can occur.

* * * * *